United States Patent [19]

Stiffler

[11] 3,805,039

[45] Apr. 16, 1974

[54] HIGH RELIABILITY SYSTEM EMPLOYING SUBELEMENT REDUNDANCY

[75] Inventor: Jack J. Stiffler, Concord, Mass.

[73] Assignee: Raytheon Company, Lexington, Mass.

[22] Filed: Nov. 30, 1972

[21] Appl. No.: 311,010

[52] U.S. Cl. .......................................... 235/153 AE

[51] Int. Cl. .......................................... G06f 11/00

[58] Field of Search ..... 235/153 AE; 340/146.1 BE; 307/204, 219; 328/97

[56] References Cited

UNITED STATES PATENTS

| | | | |
|---|---|---|---|
| 3,665,418 | 5/1972 | Bouricius et al. | 235/153 AK |
| 3,170,071 | 2/1965 | Griesmer et al. | 235/153 AE |
| 3,302,182 | 1/1967 | Lynch et al. | 235/153 AE |
| 3,356,837 | 12/1967 | Raymond | 235/153 AE |
| 3,364,468 | 1/1968 | Haibt et al. | 235/153 AE |
| 3,445,811 | 5/1969 | Hashimoto et al. | 235/153 AE |
| 3,614,401 | 10/1971 | Lode | 235/153 AE |
| 3,665,173 | 5/1972 | Bouricius et al. | 235/153 AE |

*Primary Examiner*—Charles E. Atkinson
*Attorney, Agent, or Firm*—Milton D. Bartlett; Joseph D. Pannone; David M. Warren

[57] ABSTRACT

A highly reliable system redundancy concept is disclosed wherein the system is divided into a number of substantially identical subelements wherein spare ones of the subelements may be substituted for failed ones of the subelements. The subelements and their corresponding loads are connected in a predetermined sequence. When one of the normally functioning subelements fails, the subelements following it in the sequence are disconnected from their corresponding loads then reconnected to the next load in the sequence. The last load in the sequence is reconnected to a spare subelement. The concept may be applied in numerous applications such as in defect tolerant computer memories, arithmetic data processing units, or in communications channel applications.

26 Claims, 13 Drawing Figures

HIGH RELIABILITY SYSTEM EMPLOYING SUBELEMENT REDUNDANCY

BACKGROUND OF THE INVENTION

Prior art attempts to construct highly reliable systems by the use of automatic substitution of spare system elements have included those cases where, if a subelement fails, that subelement is switched out of the circuit and a spare subelement is substituted directly therefor without affecting any of the other subelements which are still operational. These systems are disadvantageous in that large numbers of switch positions are required for implementation of any but the most rudimentary systems since connections must be made with the switch from each functioning subelement position to each of the spare subelements. Also, the control circuitry normally required in such attempts is unduly complicated requiring a separate control state for each of the multitude of switch positions of each switch.

Other prior art attempts to achieve high system reliability have included triple or higher modular redundancy where each element is duplicated three or more times and a poll is taken among the elements. The majority vote among the plurality of elements is taken to be the true output. This particular attempt is particularly disadvantageous in that large numbers of extra components are required. Furthermore, the long term reliability achieved with such a configuration may be shown in some cases to be less than would be achieved with just a single system element without the use of the polling means.

In attempts to apply fault correction principles to computer memories, attempts have been made to use a second memory to record which locations within the main memory are malfunctioning. Such systems necessarily include means for routing data into locations other than those in which faults have been detected. As in other prior art attempts, such systems require large numbers of extra componentsas well as very complicated associated control circuitry as welll as a separate memory.

Still further prior art attempts to solve such problems have included systems wherein inputs are shifted away from a failed bit plane within an arithmetic logic unit. However, those attempts have not demonstrated how such principles could be applied other than to arithmetic logic units or to cases where it is desired to have more than a single spare.

BRIEF DESCRIPTION OF THE DRAWINGS

The aforementioned objects and other features of the invention are explained in the following description taken in connection with the accompanying drawings wherein.

SUMMARY OF THE INVENTION

Figure 1A:
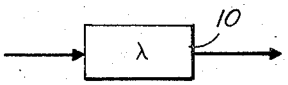
FIGS. 1*a* through 1*e* are block diagrams of various methods for providing spare system elements or subelements.

The problems of the prior art may be overcome by providing a system comprising the combination of a plurality of elements, a plurality of utilizing means connected to the elements in a predetermined order, and means for changing the connection positions of a plurality of the utilizing means by an equal number of positions. At least some of the utilizing means are connected to different ones of the elements. The changing means is coupled to both the elements and the utilizing means. There are a variety of applications for such systems as in systems where the elements comprise the segments of an arithmetic unit such as an arithmetic unit which may be divided into a plurality of identically functioning sequentially connected segments. The utilizing means in such a system would include a computer register coupled to the arithmetic unit. Other computer, data processing, or control uses include the usage of the present invention where each of the elements comprises one or more of the bit lines of a memory. In such a memory, there is one bit line for each of the parallel input and output bits where there is a single bit storage capability for each bit line for each available memory address. The utilizing means in the above cases include data utilizing means in a computer, for example, in the computer central processing unit. However, the utilizing means is not limited to computer applications as in the case where the elements comprise communications channels. In some embodiments of the invention, the means for changing the connection positions of a plurality of the utilizing means comprises switch means. The changing or switch means may be activated upon a malfunction in one of the plurality of elements in response to a means for detecting a malfunction in one of the elements, the detecting means being coupled to the elements. In still more specific embodiments, there may be at least one more of the elements than there are utilizing means. In some of those instances, the number of elements which exceed the number of utilizing means may be used as spare elements and may be substituted for those of the elements which have failed. This substitution may be effected by the changing means. In still other embodiments of the present invention where nonarithmetic elements are used, the changing means may include means for changing the connection positions of one or more of said utilizing means by an equal number of positions.

Furthermore, in accordance with the present invention, means for providing a plurality of input signals may be combined with an equal number of normally functioning elements which are arranged in an ordered sequence and each of which have input and output ports. Arranged as a continuation of the sequence of normally functioning modules, there is a sequence formed from a plurality of spare elements, each also having input and output ports. Means is then provided for connecting each of the input signals to the input port of a selected element within a set of elements which is comprised wholly from the normally functioning elements or partly from the normally functioning elements and partly from the spare elements. The connecting means is coupled to the normally functioning elements and to the spare elements. There are nonidentical but overlapping sets for each input signal. The elements within each set are adjacent to one another in the sequence comprising the combination of the sequences of normally functioning and spare elements. The number of elements in each set is equal to one more than the number of spare elements. The elements which are connected to the input signals generate output signals which are connected from the output ports of the elements to output utilizing means by connecting means. Means are provided for changing to which element within the sets of elements a plurality of the input signals and utilizing means are connected. This changing means changes by an equal number of sequence positions for each of the input signals and utilizing means the elements to which the input signals and output utilizing means are connected. This combination in some embodiments further comprises means for detecting a malfunction of any of the normally functioning or spare elements. The changing means may operate in response to this detecting means. As before, the elements may comprise bit lines within a memory, bit segments within an arithmetic unit, or communications channels although not limited to those applications. The input and output ports of the elements may be combined to form bidirectional input/output ports as may the means for connecting the input signals to the input ports and the means for connecting the utilizing means to the output ports be combined to form bidirectional connecting means.

DESCRIPTION OF THE PREFERRED EMBODIMENT

Figure 1B:
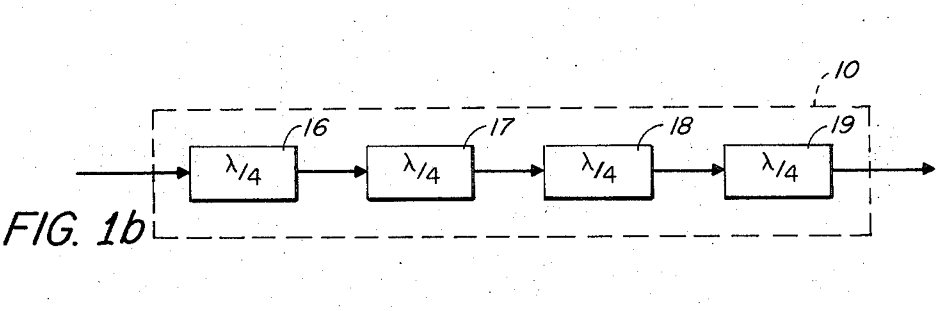
Figure 1C:
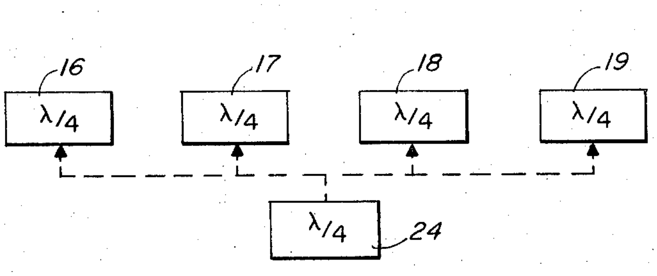
Figure 1D:
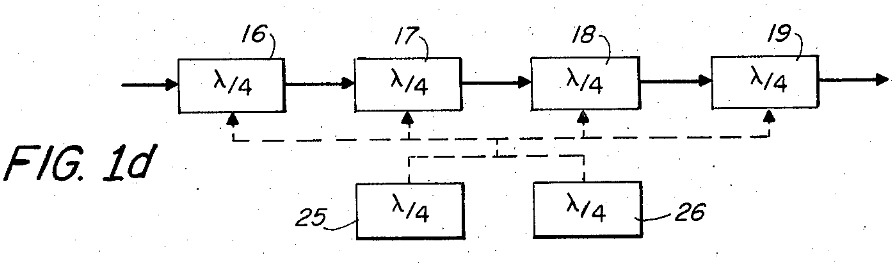
Figure 1E:
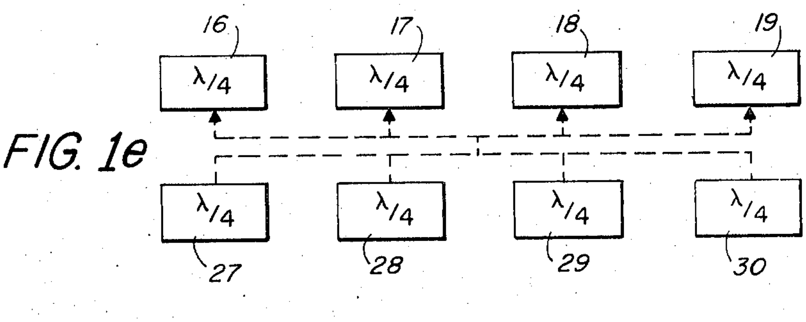

FIGS. 1*a* through 1*e* illustrate the improvements in reliability that may be achieved with systems constructed in accordance with the present invention. In FIG. 1*a* is shown a single element 10 which is assumed to obey the exponential failure rate law where the failure rate is $\lambda$. In accordance with the exponential failure rate law, the single unit will have a mean time before failure (MTBF) of $1/\lambda$. In FIG. 1b this single element has been divided into four identical subelements each of which must function properly before the entire unit is operative. Each subelement 16 through 19 is also assumed to obey the exponential failure law and thereby each subelement 16 through 19 has an assumed failure rate of $\lambda/4$. FIG. 1*c* illustrates a single spare unit 24 with the same failure rate $\lambda/4$ as the other subelements 16 through 19 which may be switched into the system as a spare for any one of the subselements 16 through 19 which fails. It may be shown by standard probability techniques that the MTBF for this configuration is $1.8/\lambda$ (see, for example, Barlow, Proschan and Hunter, *Mathemetical Theory of Reliability*, or Feller, *An Introduction to Probability Theory and Its Applications*). Thus, with the addition of only a single subelement and appropriate switching, the MTBF has been increased by 80 percent with only a 25 percent increase in the number of subelements. In FIG. 1*d*, two subelements 25 and 26 may be switched into the system in the place of any of the subelements 16 through 19 which fail. The MTBF in this case is $2.467/\lambda$. This may be contrasted with an example of where each subelement 16 through 19 separately is provided with a spare substitutable only for that particular subelement upon its failure. In this case, it may be shown that the MTBF is equal to $2.38/\lambda$. It is to be noted that in this case a four-fold increase in subelement count is required to achieve this MTBF, whereas in the case illustrated in FIG. 1*d*, only half that number of spare elements are needed yet the MTBF is higher for the latter case. In FIG. 1e is shown a similar case but where four spare subelements 27 through 30 may each be substituted for any one of the subelements 16 through 19. The MTBF in this case is equal to $3.54/\lambda$ for a 100 percent increase in hardware as contrasted with the case where each subelement has a committed separate spare and its MTBF of $2.38/\lambda$. Furthermore, it should be noted that the values for MTBF will increase if it is assumed that the failure rate is lower for the spare subelements while they are maintained in standby status.

Figure 2A:
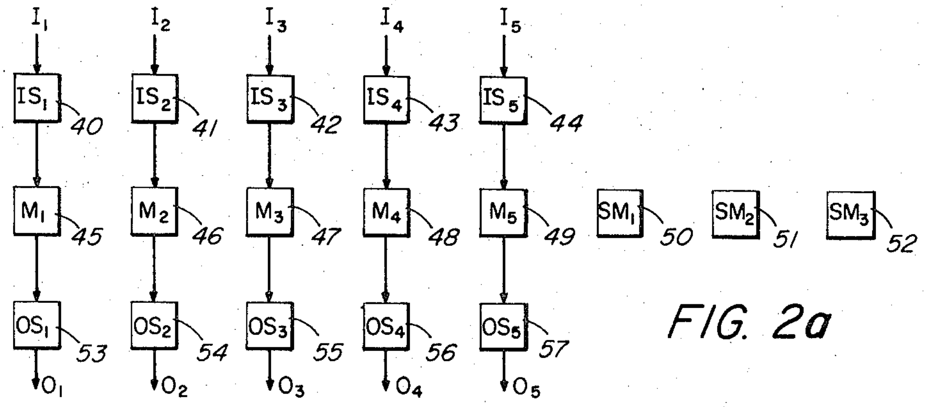
FIGS. 2*a* through 2*d* are a time sequence of block diagrams of a system in accordance with the present invention whereby spare modules are switched into the system upon the failure of one or more of the normally functioning modules.
Figure 2B:
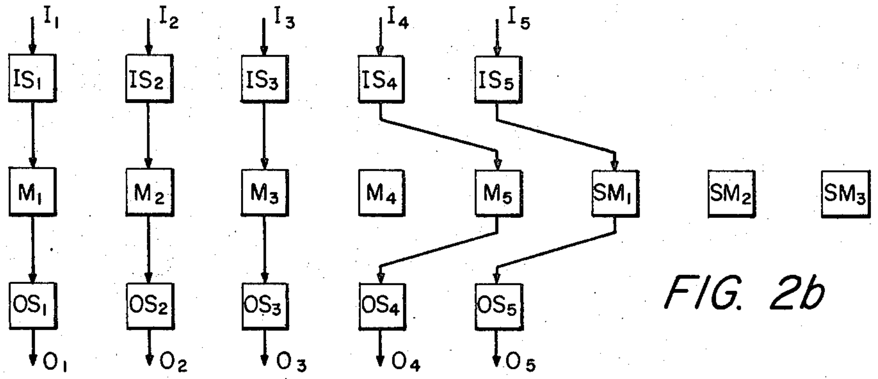

FIGS. 2*a* through 2*d* illustrate the basic concept in accordance with the present invention used to implement a system where spare elements are switched into the system upon the failure of any one of the operating elements. Input signals $I_1$ through $I_5$ are brought into the system through input switches $IS_1$ through $IS_5$ shown as blocks 40 through 44. It is to be understood that the numbering of the blocks in FIG. 2*a* applies as well to FIGS. 2*b*, 2*c* and 2*d*. From the input switches 40 through 44, the input signals are connected to functioning elements or modules $M_1$ through $M_5$ shown as blocks 45 through 49. After being operated upon by these modules, the signals are passed through output switches 53 through 57 shown in the blocks $OS_1$ through $OS_5$. From the output switches the signals are coupled to the output loads $O_1$ through $O_5$. Spare modules 50 through 52 are shown as blocks $SM_1$ through $SM_3$. In FIG. 2*b*, module $M_4$ 48 is assumed to have failed. In that case, input switches 43 and 44 switch their respective signals from modules $M_4$ 48 and $M_5$ 49 to modules $M_5$ 49 and $SM_1$ 50 respectively. At the same time, the output switches $OS_4$ 56 and $OS_5$ 57 connect their respective inputs to the outputs of modules $M_5$ 49 and $SM_1$ 50. The signal path for $I_4$ has changed from $I_4$-$IS_4$-$M_4$-$OS_4$-$O_4$ to $I_4$-$IS_4$-$M_5$-$OS_4$-$O_4$ and the path for signal $I_5$ has changed from $I_5$-$IS_5$-$M_5$-$OS_5$-$O_5$ to $I_5$-$IS_5$-$SM_1$-$OS_5$-$O_5$.

It may be readily seen that with the configuration as shown in FIG. 2*b*, the switching required with this type of system is much simpler than that which would be required if each of the spare modules had to be able to be switched into the position of any one of the normally operating modules 45 through 49. In the presently illustrated case, switching connections for the case of three spare modules need only be made from input switches to the normally active module to which each module is normally connected and to the three adjacent modules further on in the sequence of modules. In contrast, if each of the spare modules had to be switched into the place of any one of the normally functioning modules, connections would have to be made from each spare module to the switches connected to each of the normally active modules. In the present example, only four connections must be made to each of the spare modules while in the case where each module must spare any of the normally active modules, five connections would have to be made to each of the spare modules. Furthermore, in the illustration of FIGS. 2*a* through 2*d*, additional normally active modules may be added without increasing the number of connections to the spare modules.

Figure 2C:
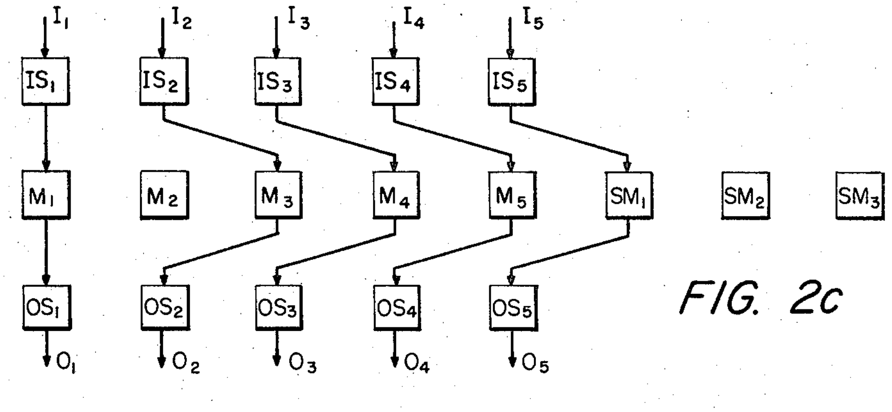
Figure 2D:
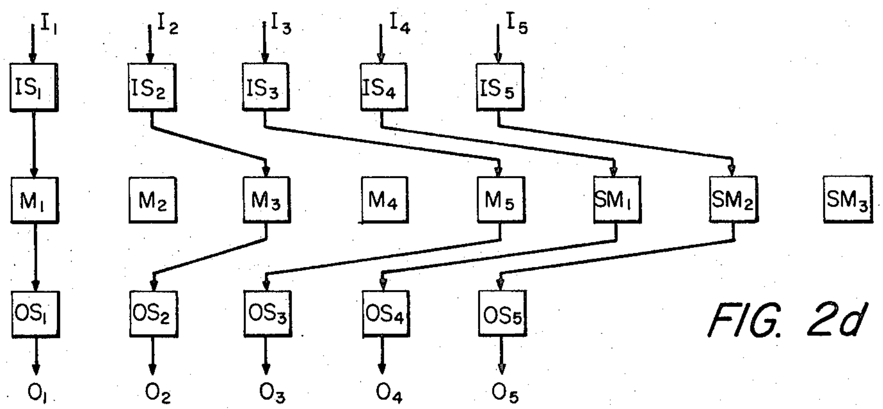

In FIG. 2c is illustrated the start of the sequence of events if more than one module fails. Here it is assumed that the module $M_4$ 48 is still malfunctioning as was shown in FIG. 2b. When module $M_2$ 46 starts to malfunction, the path for signal $I_2$ which was previously $I_2$-$IS_2$-$M_2$-$OS_2$-$O_2$ is now configured to $I_2$-$IS_2$-$M_3$-$OS_2$-$OS_2$-$O_2$ while the path for signal $I_3$ is $I_3$-$IS_3$-$M_4$-$OS_3$-$O_3$. The module $M_4$ 48 which was previously switched out of the system as it was malfunctioning has now been configured back into the system. If it is still malfunctioning, the input signals to the right of module $M_4$ must be shifted down another space to modules $SM_1$ 50 and $SM_2$ 51 so that the signals connected to the still malfunctioning $M_4$ 48 may be connected to module $M_5$. This case is illustrated in FIG. 2d where the path for signal $I_3$ is now $I_3$-$IS_3$-$M_5$-$OS_3$-$O_3$, the path for signal $I_4$ is $I_4$-$IS_4$-$SM_1$-$OS_4$-$O_4$ and the path for signal $I_5$ is $I_5$-$IS_5$-$SM_2$-$OS_5$-$O_5$. If another malfunctioning module fails, the system can further be reconfigured as discussed above so that module $SM_3$ 52 is switched into the system and the third malfunctioning module left disconnected after the appropriate shifts have been made.

Figure 3:
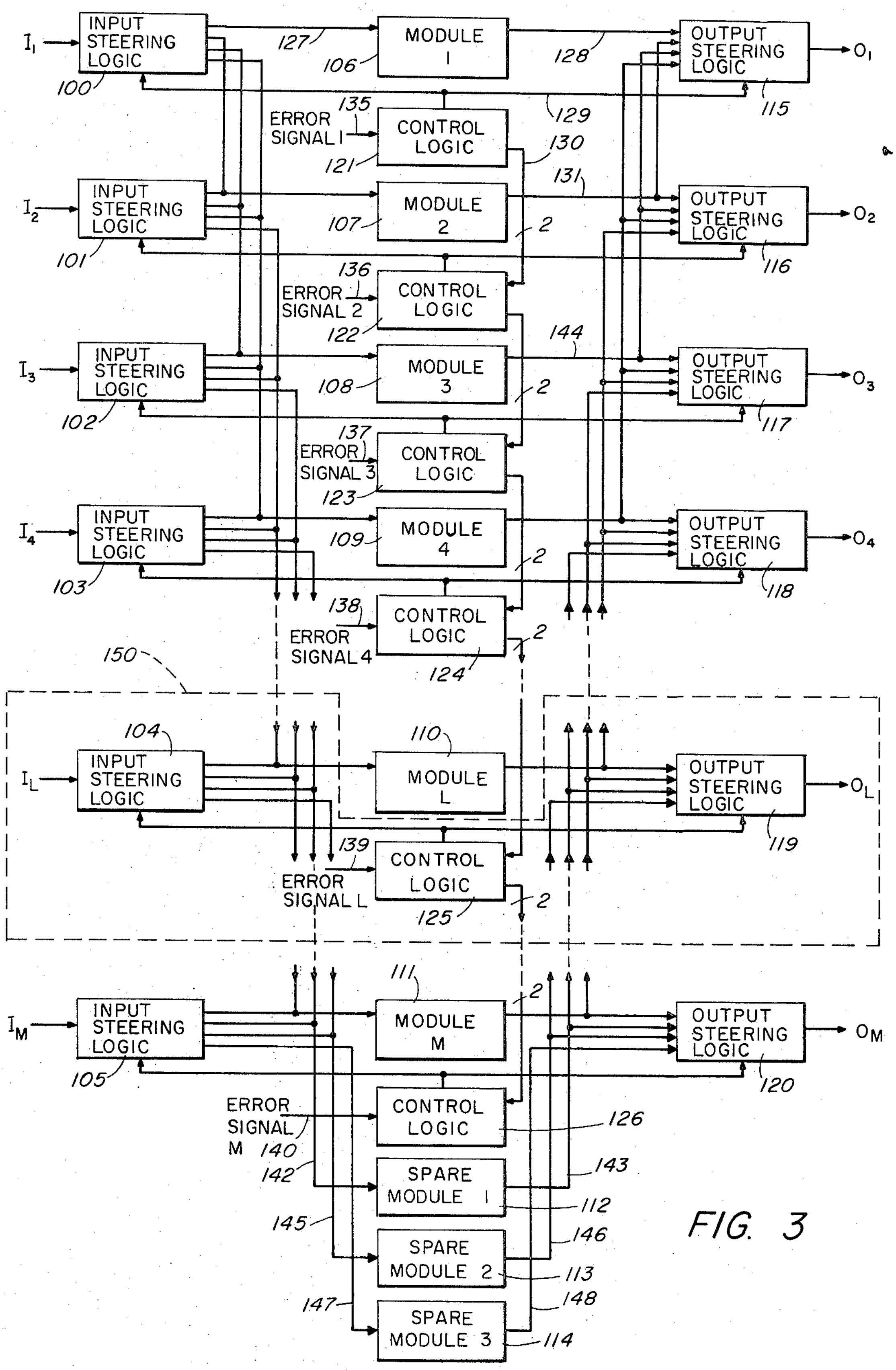
FIG. 3 is a block diagram of a system consisting of a plurality of modules with three spare modules and associated switching circuitry constructed in accordance with the present invention.

In FIG. 3 is shown the block diagram of a modular system in accordance with the present invention which may be used, for example, in a computer memory system or in a computer central processing unit. This system is constructed with an arbitrary number of M inputs and M outputs to a set of M normally operational modules with three spare modules available. A typical slice of sequence number L is shown within dotted lines at 150. If there are no module failures, the input signals are connected through each of the inut steering logics 100 through 105 to each of the normally active modules 106 through 110 to the output steering logics 115 through 120. In normal operation where none of the normally operational modules have failed, input $I_1$ is connected through input steering logic 100 to line 127 into module-1 106. After the signal is operated upon by module-1 106, it is coupled to line 128 which connects the signal to the output steering logic 115 and finally to output $0_1$. The control logic 121 for this segment of the circuitry controls the input steering logic 100 and output steering logic 115 such that the path configuration described above is achieved. If module-1 106 fails, the system will reconfigure substantially in the manner described in connection with FIGS. 2a through 2d. It will be connected through input steering logic 100 to line 132 to module-2 107 to line 131 to output steering logic 115 and output $0_1$. At the same time, each of the following inputs $I_2$ through $I_M$ are similarly routed through the next adjacent module then back to their own corresponding output steering logic. Input $I_M$ will be connected through input steering logic 105 to line 142 to spare module-1 112 to line 143 and through output steering logic 120 to output $O_M$. This shifting in sequence is activated by error signal 135 which is supplied by an external error detector and is connected to control logic 121. Control logic 121 initiates the input and output connection shifts which connect input $I_1$ and output $O_2$ to module-2 107 rather than module-1 106. Also, control logic 121 generates a signal on lines 130 which notifies control logic-2 122 that a shift has been made for the previous bit and that control logic-2 122 should initiate the same shifting action also. The number of bits in a binary system which must be connected between control logics is required to be sufficient to cause as many shifts as are possible for the number of spare modules provided. For the system shown in FIG. 3, there are three spare modules and hence it would require at least two control lines, assuming binary encoded logic, for lines 130 for the four possibilities of zero, one, two or three shifts. Similar to the illustration in FIGS. 2a through 2d, if both modules 1 and 2 have failed, input $I_1$ will be coupled through input steering logic 100 to line 133 to module-3 108 onto line 144 and back to steering logic 115 and $O_1$. The other input signals will be coupled by their respective input steering logics, under control of the individual control logics, through the appropriate modules. In the case where modules 106 and 107 have both failed but all the other modules are functioning, the last input $I_M$ will be coupled through input steering logic 105 to line 145 through spare module-2 113 and to line 146 then through output steering logic 120 to output $O_M$. Furthermore, if any of the other modules 106 through 111 have failed, the input $I_M$ will be coupled through input steering logic 105 to line 147 through spare module-3 141 and line 148 then to output steering logic 120 and output $O_M$. If one of the intermediate modules, such as module-L 110 had failed previously, the switching sequence would be similar to that shown in FIGS. 2c and 2d. Once inputs and outputs are connected to a module which has previously been switched out of the system because it has failed, when that module is connected back into the system because of a shift caused by the failure of a module lower in the sequence of modules, that module will again cause an error signal to be generated if it is still malfunctioning. The signals connected to the previously failed module and to the following modules will be shifted once more to avoid the previously failed module. With all of these cases each control logic 106 to 126 will notify each succeeding control logic as to how many failures have occurred previously to any of the preceding modules including that particular control logic. The succeeding control logics can then control the corresponding input and output steering logics for the proper number of shifts which should be made so that the appropriate inputs and outputs may be configured through those input and output steering logics. As mentioned earlier, the error signals 135 through 140 are inputs from an external error detector not illustrated in this figure. If the unit were used as part of a computer memory system, for example, the error signals 135 through 140 could be generated from a Hamming code detector or, if the system were part of an arithmetic logic unit, the error signals could be generated as the result of performing preprogrammed arithmetic operations with prestored final results. An error signal may be generated if two corresponding bits which are compared between the calculated and stored results are identical. It is also possible that an error signal may be generated within each module or each control logic for each bit in the system. An illustration of the latter case will be discussed in conjunction with FIGS. 5a and 5b.

Figure 4:
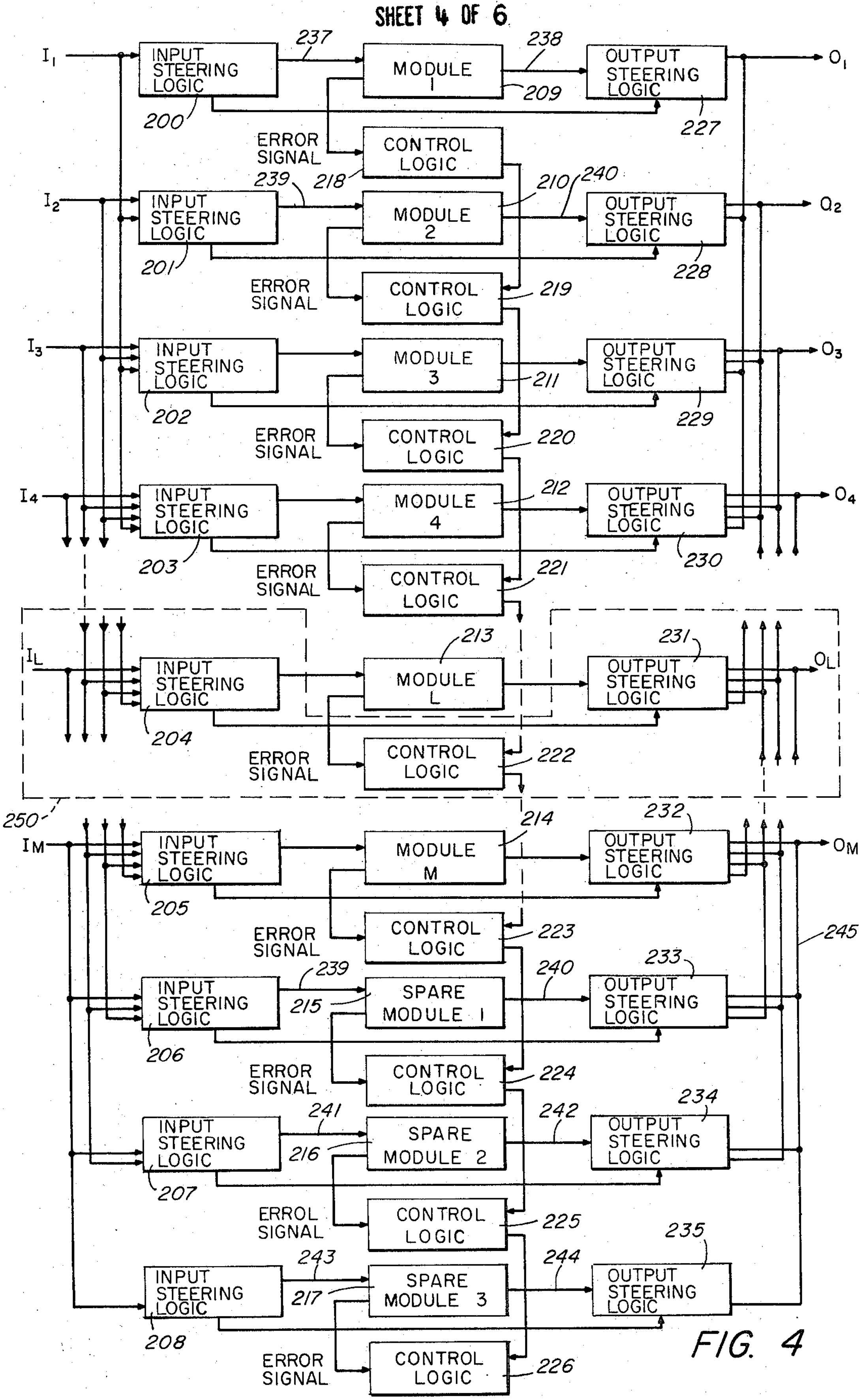
FIG. 4 is an alternative embodiment of the system of FIG. 3.

FIG. 4 shows an alternative method of constructing a system in accordance with the present invention which achieves the same results as the system shown in FIG. 3 but with a somewhat different component configuratlon. A typical slice of the circuitry of sequence number L is shown within the dotted lines at 250. In normal operation, input signal $I_1$ is connected through input steering logic 200 to line 237 and through module-1 209 to line 238 and the output steering logic 227 and output $O_1$. Should module 209 fail, input $I_1$ will be connected, not as shown in FIG. 3 to the first input steering logic where it is steered to the next module, but is here connected to the second input steering logic 201 and line 239 to module-2 210 then to line 246 to output steering logic 228 and output $O_1$. Each succeeding input is then routed through one module further in the sequence from the one to which it is normally connected.

In the case of a single previous module failure, input $I_M$ will be connected through input steering logic 206 to line 239 and spare module-1 215 to line 240 and output steering logic 233, line 245 and output $O_M$. The output $O_M$ is electrically connected only to spare module 215 via output steering logic 233 as the other output steering logics 232, 234 and 235 to which output $O_M$ is also routed have their corresponding modules electrically disconnected from that particular line for the case of a single module failure. Furthermore, if there are two previous module failures, input $I_M$ will be connected through input steering logic 207 to line 241 through spare module-2 216 to line 242 then to output steering logic 234 and output $O_M$ on line 245. Finally, if there are three previous failures among the normally functioning modules, input $I_M$ will be connected to input steering logic 208 and not through any of the other input steering logics 205, 206 and 207 to which it is also routed. From input steering logic 208, the $I_M$ signal is then coupled to line 243, to spare module-3 217, line 244, output steering logic 235 and output $O_M$. In the system of FIG. 4, as in the system of FIG. 3, the control signals which are connected between control logics 218 to 226 each indicate to the succeeding control logic how many module failures have occurred among the previous modules including that within the same slice as that particular control logic. It should be noted that within the examples both of FIGS. 3 and 4, that connections need be made from each input or input steering logic only to three of the other slices and that each spare module does not have to be connected to every input and output signal. Furthermore, it is an advantage with the type of system constructed in accordance with the present invention, that additional normally functioning modules may be added to the system without having to make new connections to the spare modules. This expansion may be accomplished by connecting the new modules at the beginning of the sequence of modules. For example, if a single new module were to be added to the system shown in FIG. 4, connections need only be made from its corresponding input and output steering logics to input steering logics for the succeeding three input steering logics 200, 201 and 202 and to output steering logics 227, 228 and 229. The connections between control logics for the new module only have to be made to the succeeding adjacent control logic 218.

The system shown in FIG. 4 is capable of correcting faults without the need for external error signals. Each module 209 through 217 includes error detection means which informs the corresponding control logic of an error within the module. A detailed description of such a system implemented with MOS logic will be discussed in conjunction with FIG. 5. The function of the control logic in the system of FIG. 4 is to select which of the up to four, if any, inputs will be connected to the corresponding module while the function of the output steering logic is to disconnect the output of a malfunctioning module from the output signal lines as only one output may be connected to each output line. In some embodiments of the invention, the input steering logic and output steering logic may be combined into a single circuit if, for example, data is to be transmitted bidirectionally on each data line.

Figure 5A:
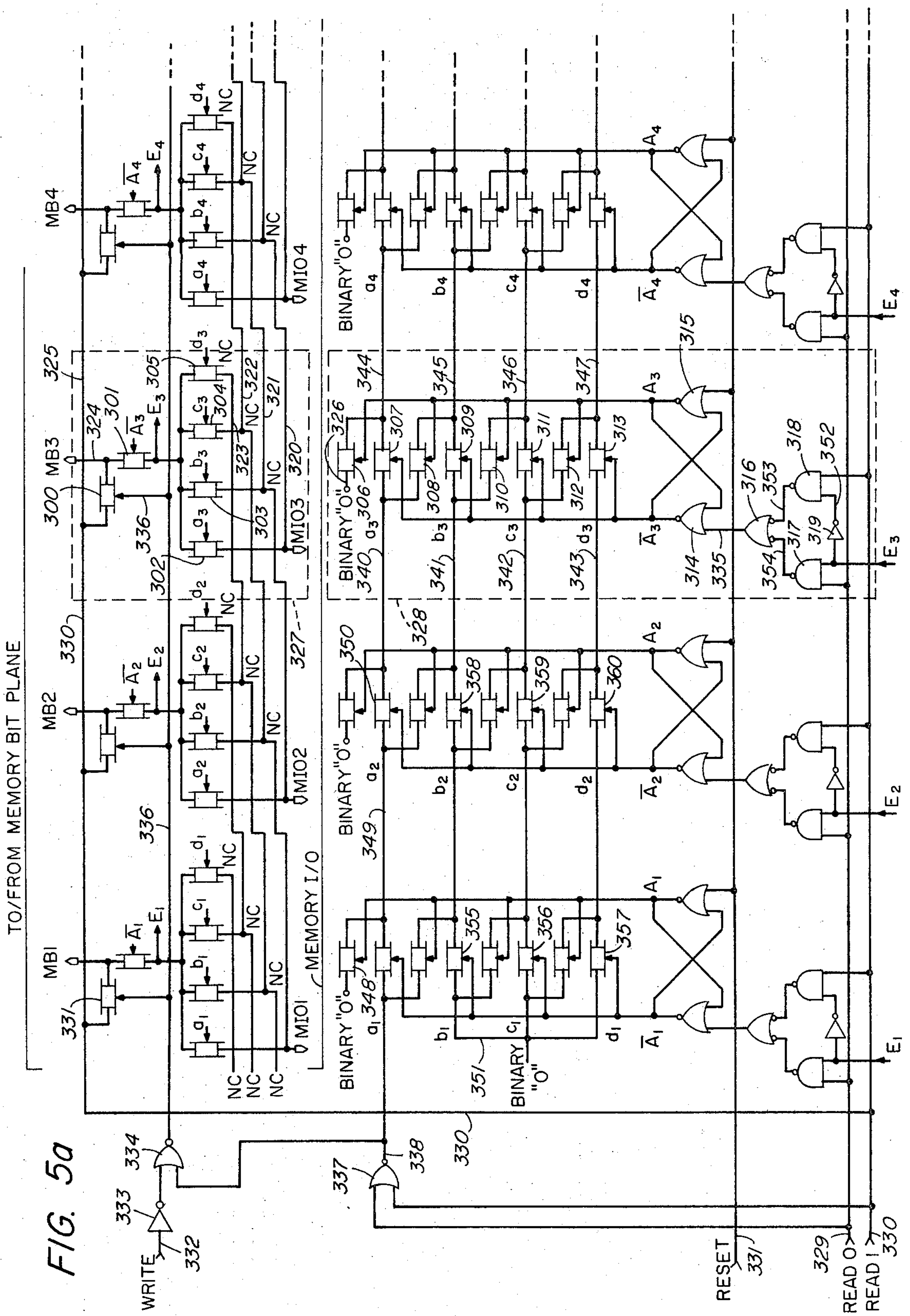
FIGS. 5*a* and 5*b* are a logic diagram of the input/output circuitry for a memory system in accordance with the present invention.
Figure 5B:
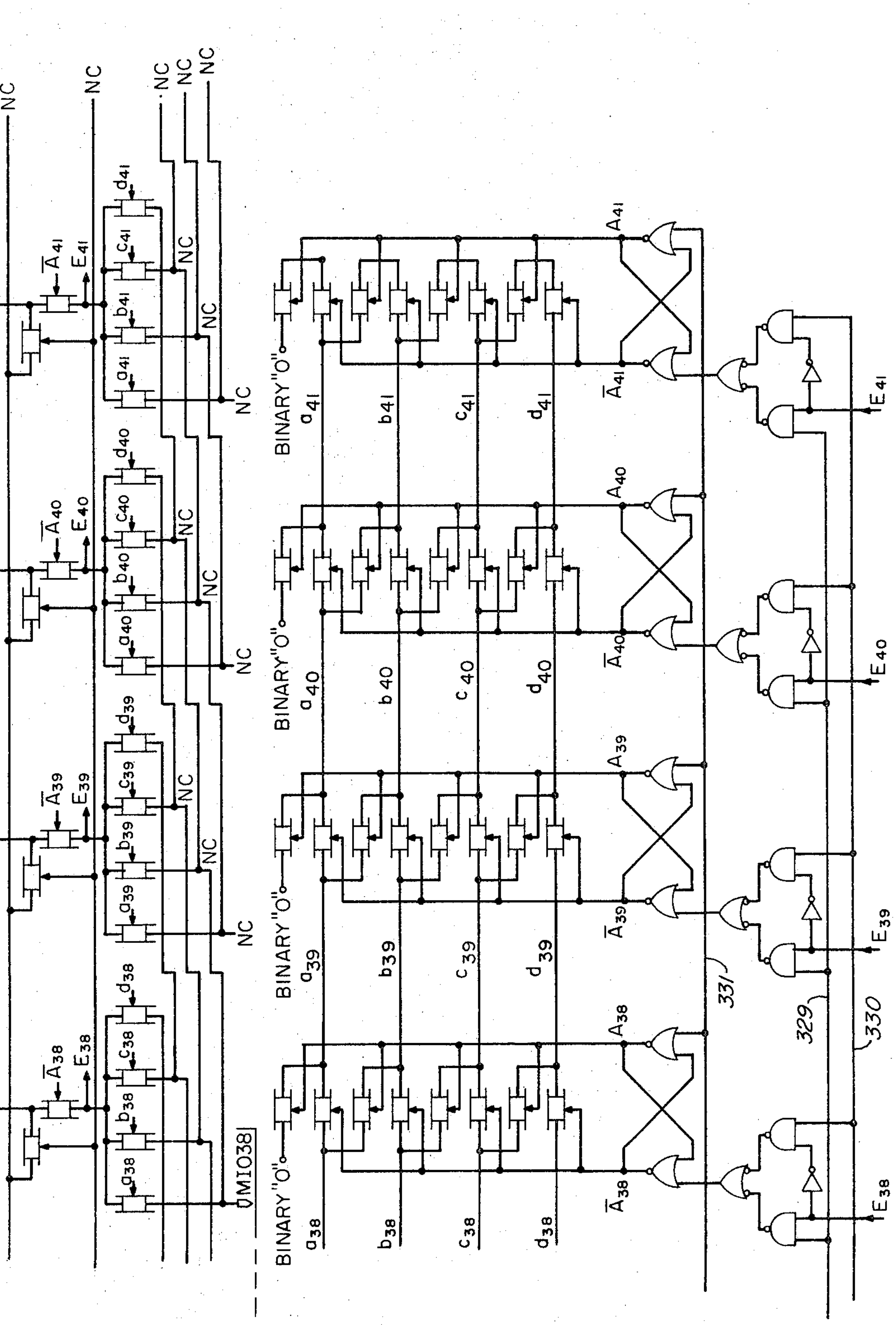

FIGS. 5a and 5b are logic diagrams of a bidirectional input/output memory system application of the present invention. In this particular example, data is read into the memory on the same lines on which it is read out of the memory. In the particular embodiment illustrated there are 38 normally functioning memory bits with lines M101 through M1038 connecting the memory system to an overall system data bus. Lines MB01 through MB038 are the normally functioning connections to the memory plane. There are provided three spare bits in the memory plane with connections SMB1 through SMB3. This circuit is an application of the invention similar to that shown in the block diagram of FIG. 4 with the exception that within the circuit shown in FIGS. 5a and 5b that input and output circuits are combined since data is transmitted in both directions on each memory bit line. An application for such a memory input/output circuit would include a computer memory with 32 data bits in each computer word with six parity check bits where there are provided three spare bits in the memory. Such a system would be useful, for example, in a spacecraft computer which must be highly reliable and operate for long periods of time without external repair. The circuit is constructed largely with bidirectional MOS gates such as the one illustrated at 331. In this type of logic component when the control signal, shown here as the vertical connection to the gate with an arrow, is in the logical 1 state, the gate will pass signals in either direction as between the horizontal lines on either side of the gate 331. When the control signal is in the logical 0 state, signals will not pass through the gate 239 in either direction and the gate assumes a high impedance state. The operation of the circuitry shown in FIGS. 5a and 5b will be explained in conjunction with the portions of the logic within dotted lines at 327 and 328 as exemplary of identical sections of the logic. NC indicates no connection at the particular point indicated. The logic within dotted lines 327 corresponds to both input and output steering logics as shown in FIG. 4 while the circuitry shown within dotted lines 328 corresponds to the control logic of FIG. 4. In normal system operation, the four control signals 340 through 343 (also labeled $a_3$ through $d_3$) are in the 1, 0, 0, 0 states respectively. The logical 1 is coupled from line 338 via gates 348 and 350. The logical 1 on line 338 is generated by NOR gate 337 as its inputs are both a logical 0 during memory read in and read out operations. Similarly, 0's are coupled from line 351 via gates 355 through 360 to lines 341, 342 and 343. All of these signals are also connected to the control inputs of gates 302 through 305. The logical 1 on line 340 ($a_3$) causes gate 302 to conduct the signal from input/output line M103 through gate 301 to memory bit line MB3 which is connected to the corresponding bit line within the memory plane. Gate 301 conducts when its control input $\overline{A}_3$ is in the logical 1 state which occurs when the corresponding memory bit is functioning properly. All the other control inputs to gates 303, 304 and 305 are in the logical 0 state before any reconfiguration occurs so that only the signal from M103 is coupled through to MB3 on line 324. If there has previously been an error detected on one of the preceding bit lines MB1 or MB2, the signal on line 340 will be a logical 0, the signal on line 341 will be a logical 1, and the signals on lines 342 and 343 will be logical 0's. In that case, the gate 303 will conduct while the other gates 302, 304 and 305 will not conduct. MIO2 from the previous bit position will be coupled through gate 303 to line 324 and to the memory bit line MB3. If the second bit in the memory plane MB2 failed, memory bit line MB2 will not be used and MB3 will be connected to the M102 input in its place. Similarly, if both the preceding bits have failed, line 340 will be in a logical 0 state as will be line 341, line 342 will be in the logical 1 state and line 343 in the logical 0 state. In that case only gate 304 conducts among gates 302 through 305 thereby coupling the signal on input/output line M101 through gate 301 to line 324 and memory bit line MB3. For that particular example, memory bits MB1 and MB2 will not be used. Also, the line M102 will be coupled to memory bit MB4. M103 and the succeeding memory input/output bits will be connected to two memory bit lines higher in order in the sequence of memory bit lines. The last input/output bit line M1038, for two previous memory bit failures, will be connected to the second one of the spare memory bits SMB2.

If the memory bit MB3 corresponding to the bit adjacent to the third slice, outlined in dotted lines, is properly functioning, $A_3$ will be in the logical 0 state and $\overline{A}_3$ in the logical 1 state. In response to the states of $A_3$ and $\overline{A}_3$, the signal on line 340 is coupled through gate 307 to line 344 and the signal on line 341 is similarly coupled to line 345 as are the signals on line 342 coupled to line 346 and on 343 to line 347 through gates 309, 311 and 313 respectively. If an error has been found within the memory bit MB3, as explained in the following paragraph, the signals $A_3$ and $\overline{A}_3$ assume the complementary state, that is, $A_3$ will be in the logical 1 state and $\overline{A}_3$ in the logical 0 state. Hence, in the case of an error, the signal on line 340 is coupled to line 345 through gate 308 and each succeeding input 341 through 343 is coupled to successively higher order lines 346 and 347. A binary 0 is coupled from line 326 through gate 306 to line 344. Furthermore, if both of the preceding two memory bits MB1 and MB2 were functioning normally with logical states, 1, 0, 0, 0 on lines 340 through 343 respectively, and with an error on memory bit MB3, the signals on lines 344 through 347 respectively would be 0, 1, 0, 0 thereby amounting to a shifting of the 1 down one line. Each succeeding error would shift the 1 down another line. If the 1 has been shifted down three lines so that at some point it appears on a "d" line, all three spares will be in use.

The error detecting capabilities of the circuit in FIGS. 5a and 5b will now be described. To test the memory bits, two steps are required. First, logical 0's are read into each memory location on lines MB1 through MB38 and SMB1 through SMB3. Immediately thereafter the memory bits are read back out to insure that all 0's are read out. A 1 read back on any line is indicative of an error on that line. Secondly, all 1's are read into the memory then read back out again. Similarly, a 0 on any line indicates an error condition. To start the operation, a pulse going from logical 0 to logical 1 and returning to logical 0 is impressed upon line 331 which couples the pulse to each of the pairs of logic NOR gates, such as 314 and 315, connected into a "bowtie" set-reset latch configuration. Thus connected, the two NOR gates form the storage for the error signal. In the typical slice within the dotted lines shown at 328, these two NOR gates are gates 314 and 315. The reset pulse from line 331 puts all of these latches in the no error state with logical 0's on the A lines and logical 1's on the $\overline{A}$ lines. To read in the logical 0, a logical 1 is impressed upon READ 0 line 329 while a logical 0 is impressed upon READ 1 line 330. These inputs produce a logical 0 on the output of NOR gate 337 on line 338. The logical 0 on line 338 is coupled to the inputs of gates 348 and all the other gates within the circuit on a horizontal line with gate 348. Since all of the latches are in the reset or no error state, no 1's are shifted down through the *a, b, c, d* lines as when an error is present. A logical 0 connected to line 351 and $b_1$, $c_1$, and $d_1$ is coupled through each gate 355, 356 and 357 to each gate on a horizontal line with the gates 355, 356 and 357. The result is that all of the control inputs to the input/output steering gates, such as gates 302, 303, 304 and 305, are all in the 0 state so that none of the memory input/output bits M101 through M1038 are coupled through to the memory bits MB1 through MB38 and SMB1 through SMB3. When a logical 0 is impressed upon line 330, it is coupled through gate 300, as in the typical slice within the dotted lines 327, and through gate 300 to line 324 and MB3. Since all of the gates 302 through 305 are in the high impedance state, they couple no signals to gate 301 which would interfere with this operation. Gate 300 conducts when the input WRITE signal is set in a logical 1 state on line 332 through inverter 333, and NOR gate 334 on line 336 to the control input of gate 300. After the logical 0 has been written into the memory location, the WRITE signal on line 332 is returned to the logical 0 state. Then, the data is read back from the memory through gate 301 and to the line marked $E_3$ which is the error indication line. This signal is fed back to inputs of NAND gate 317 and inverter 319. If the 0 was read back correctly as a 0, $E_3$ will, of course, also be a 0. When this 0 is NAND'ed with the 1 on line 329, a 1 will appear on the output of NAND gate 317 and hence at the input of low truth OR gate 315. The output of gate 315 will be a logical 0 causing no change in the state of the latch composed of NOR gates 314 and 315. If a 0 was read back as 1, $E_3$ will be a 1. At NAND gate 317, the signal is NAND'ed with the READ 0 signal from line 329 which is a 1 thereby producing a 0 on the output of gate 317 and a 1 on the output of gate 315 thereby causing the latch composed of gates 314 and 315 to change state, namely, that $A_3$ is a 1 while $\overline{A}_3$ is a 0. This causes the shifting of the control bits down one position in the a, b, c, d lines as discussed earlier in conjunction with the description of the gates within dotted lines 328. In the second step, the READ 0 line 329 is a logical 0 while the READ 1 line 330 is a 1 so that all 1's may be read into the memory. The logical 1 on the READ 1 line 330 is also connected to NOR gate 337 which, as described earlier, causes all of the input steering gates to assume a high impedance state after a pulse has been applied to the RESET line 331. The 1 on the READ 1 line 330 is coupled through gate 300 to line 324 and into the memory bit location at MB3 when the WRITE line 332 is placed in the logical 1 state. If 1's are read back where 1's were read in, $E_3$ will be a logical 1. The signal on $E_3$ is inverted by inverter 319 and is coupled to an input of NAND gate 318 where the inverted $E_3$ is NAND'ed with the logical 1 on line 330. If the read in 1 is read back as a 1, the inverted $E_3$ input to NAND gate 318 is a 0 causing the output of the gate on line 353 to be a logical 1. The error storage latch composed of gates 317 and 318 does not change state in that instance. However, if a 1 was read in and a 0 read out, the inverted $E_3$ input to gate 318 will be a 1. When that 1 is NAND'ed with the 1 from READ 1 line 330, a logical 0 is produced on the output of gate 318 on line 353. The 0 on line 353 causes the output of low truth OR gate 315 to be a 1 and hence cause the error storage latch to change to the error state and initiate a shift.

In either case, when the latch assumes the error state, the M103 input/output is disconnected from MB3 and reconnected to MB4, assuming no previous errors and all succeeding input/output connections will be shifted down one line. Any error in a succeeding memory bit line will cause the input/output line connected to the memory bit line before the detection of the error and the input/output lines following that line in succession to shift down one more memory bit line location. A spare memory bit line is connected into the system at the end towards which the shifts are made each time a shift is executed.

It may readily be seen by one skilled in the art that some of the gates within the circuit may be eiliminated if desired. These are the input steering gates to which no connections are made to their inputs. However, in a practical system, it may be desired to retain these surplus gates so that extra bits may be connected into the system. The gates are retained in the drawing of FIGS. 5*a* and 5*b* to show that each slice of the circuitry is identical, thereby facilitating the construction of such a circuit if desired using monolithic or modular large scale integration techniques.

This concludes the detailed description of the preferred embodiment of the invention. Although a preferred embodiment has been described, numerous modifications and alterations to this description would be obvious to one skilled in the art without departing from the spirit and scope of the invention. For example, uses other than a computer memory system can be made of the present invention, such as an arithmetic processing unit in a computer. Furthermore, the present invention could be used for substitution of failed communications links such as in a microwave relay system or in a telephone communications system. The concept may also be applied in the use or fabrication of semiconductor memories such as random access memories or read only memories.

What is claimed is:

1. In combination:
a plurality of elements;
a plurality of utilizing means connected to said elements in a predetermined order, at least some of said utilizing means being connected to different ones of said elements; and
means for changing the connection positions of a plurality of said utilizing means by an equal number of positions, said changing means being coupled to said elements and to said utilizing means.

2. The combination of claim 1 wherein said plurality of elements comprises the segments of an arithmetic unit.

3. The combination of claim 2 wherein said plurality of utilizing means comprises the bits of a computer register coupled to said plurality of elements.

4. The combination of claim 1 wherein each element of said plurality of elements comprises one or more memory bit lines of a memory.

5. The combination of claim 4 wherein said means for changing the connection positions of a plurality of said utilizing means comprises switch means.

6. The combination of claim 5 wherein said plurality of utilizing means comprises data utilizing means in a computer.

7. The combination of claim 6 further comprising means for detecting a malfunction in one of said plurality of elements, said changing means operating in response to said detecting means, said detecting means being coupled to said elements.

8. The combination of claim 1 wherein said plurality of elements are at least one more in number than the number of said utilizing means.

9. The combination of claim 8 wherein excess ones of said plurality of elements are substituted for ones of said plurality of elements which have failed.

10. The combination of claim 9 wherein said excess ones of said plurality of elements are substituted by said changing means for ones of said plurality of elements which have failed.

11. The combination of claim 1 wherein said plurality of elements comprises communications channels.

12. In combination:
a plurality of nonarithmetic elements;
a plurality of utilizing means connected to said elements in a predetermined order, at least some of said utilizing means being connected to different ones of said elements; and
means for changing the connection positions of one or more of said utilizing means by an equal number of positions, said changing means being coupled to said elements and to said utilizing means.

13. The combination of claim 12 wherein said plurality of nonarithmetic elements comprises lines of a memory.

14. The combination of claim 13 wherein said plurality of utilizing means comprises data utilizing means in a computer.

15. The combination of claim 13 wherein said plurality of elements are at least one more in number than the number of said utilizing means.

16. The combination of claim 15 wherein excess ones of said plurality of elements are substituted for ones of said plurality of elements which have failed.

17. The combination of claim 16 wherein said excess ones of said plurality of elements are substituted by said changing means for ones of said plurality of elements which have failed.

18. The combination of claim 9 wherein said plurality of nonarithmetic elements comprises communications channels.

19. In combination:
means for providing a plurality of input signals;
a plurality of normally functioning elements, said elements each having an input port and an output port, and said normally functioning elements being arranged in an ordered sequence and being equal in number to the number of said input signals;
a plurality of spare elements, said spare elements each having an input port and an output port, said spare elements being arranged in an ordered sequence, said sequence of spare elements being arranged as a continuation of said sequence of normally functioning elements;

means for connecting each of said input signals to the input port of a selected element within a set of elements from among said pluralities of normally functioning elements and spare elements, the number of elements in said set of elements being equal in number to one more than the number of said spare elements and the elements in said set of elements being adjacent to one another in said sequence of said normally functioning elements and said spare elements, said connecting means being coupled to said normally functioning elements and to said spare elements;

means for utilizing a plurality of output signals, said output signals being generated by those elements of said plurality of normally functioning elements and said plurality of spare elements which are connected to said input signals;

means for connecting said utilizing means to the output ports of said elements which are connected to said input signals; and means for changing to which element within said sets of elements a plurality of said input signals and said utilizing means are connected, said changing means changing by an equal number of sequence positions for each of the plurality of input signals and output utilizing means the elements within said sets of elements to which said plurality of input signals and said output utilizing means are connected.

20. The combination according to claim 19 further comprising means for detecting a malfunction of any of said elements within said pluralities of normally functioning and spare modules, said detecting means being coupled to said elements.

21. The combination according to claim 20 wherein said changing means operate in response to said detecting means.

22. The combination according to claim 21 wherein each element of said plurality of elements comprises one or more bit lines within a memory.

23. The combination according to claim 22 wherein said elements comprise segments within an arithmetic unit.

24. The combination according to claim 23 wherein said elements comprise communications channels.

25. The combination according to claim 22 wherein said input and output ports of each of said elements are combined to form a single bidirectional port.

26. The combination according to claim 25 wherein said means for connecting the input signals to the input ports of the elements and said means for connecting the utilizing means to the output ports of the elements comprise a single bidirectional connecting means.

* * * * *